J. HARRIS.
RECIPROCATING-CHURN.

No. 193,332.  Patented July 24, 1877.

Witnesses
C. L. Pond
Wm. S. Grosvenor

Inventor
John Harris.
Per, James Sangster.
Atty

UNITED STATES PATENT OFFICE.

JOHN HARRIS, OF BUENA VISTA, NEW YORK.

IMPROVEMENT IN RECIPROCATING CHURNS.

Specification forming part of Letters Patent No. 193,332, dated July 24, 1877; application filed June 25, 1877.

*To all whom it may concern:*

Be it known that I, JOHN HARRIS, of Buena Vista, in the county of Steuben and State of New York, have invented certain new and useful Improvements in Churns, which improvements are fully set forth in the following specification and accompanying drawings, in which—

Figure 1:
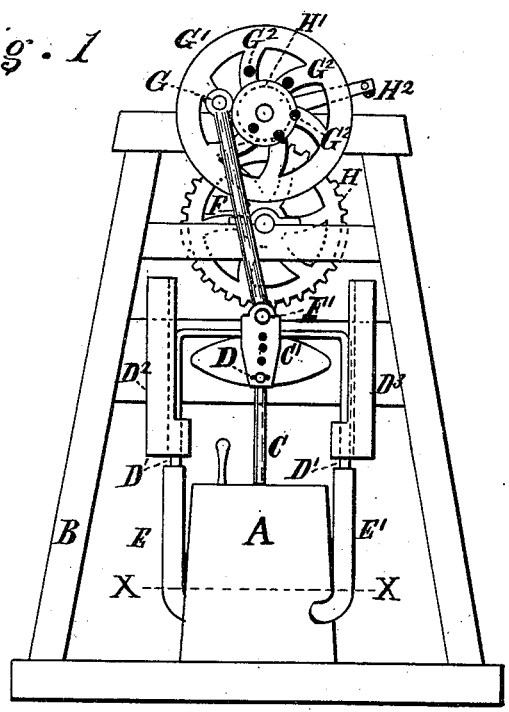
Figure 2:
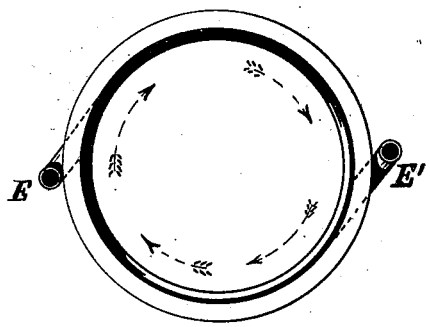
Figure 3:

Figure 1 represents a front elevation; Fig. 2, a horizontal section through line $x\ x$, Fig. 1; and Fig. 3, a vertical central section through the pump—a device for forcing air and giving an agitation to the cream in addition to that produced by the dasher, as will be more clearly hereinafter described.

The object of my invention is to produce a simple and rapid churning device. It consists (in a churn operated by gearing) of the dasher and its connecting-rods and pins, in combination with a crank-wheel provided with a series of holes, or their equivalents, to receive the pin or connecting-rod for connecting the upper end of said rod thereto arranged in the form of a volute or scroll around the face of the same, for the purpose of conveniently regulating the length of the stroke of the dasher; also, in the arrangement and combination of a pump with the churn and piston cross-head arranged so as to enter the churn at a tangent to the circumference of the same, or nearly so, for the purpose of supplying the cream with air, and producing an additional or rotative movement of the same.

The churn A is arranged within a frame, B, so as to be easily removable. The dotted lines show the dasher, which, being of the ordinary construction, requires no further description. C is the piston or dasher-handle. It is connected to the cross-head C' by means of a screw-bolt, D, and is held so as to reciprocate in a straight vertical line by means of the bent rod $D^1\ D^1$, which passes through the grooved braces $D^2\ D^3$, as shown, and from thence into the pumps E and E', thereby acting as a pump-rod for either one or two pumps, as may be required. F represents the connecting-rod, connected to the cross-head by a bolt or pin, F', and by means of the screw-bolt G, to the crank-wheel $G^1$, which is provided with a series of holes, $G^2$, to fit the removable bolt G, arranged in the line of a scroll, as shown, so that the length of the stroke may be varied according to the quantity of cream in the churn, a larger amount of cream requiring a longer stroke. The churn is operated by means of the gearing H $H^1$ and handle or crank $H^2$. The arrangement of the valves in the pump is shown in the section, Fig. 3, I J showing the position of the valves and the dotted lines their position when open.

The pumps, of which there may be one or two, are made removable, so as to be easily taken off, when necessary. They are connected to the churn, as in Fig. 2, so as to force the air and cream in the direction of the arrows, which operation, as will be readily seen, brings the cream more completely under the action of the dasher, and at the same time freely supplies it with air, thereby providing all that a good rapid-operating churn requires.

I claim as my invention—

1. The churn A, rod C, and cross-head C', provided with the bent rod $D^1\ D^1$, and connected with the braces $D^2\ D^3$, as specified, in combination with the connecting-rod F, pin G, and crank-wheel $G^1$, provided with the holes $G^2$, arranged substantially as and for the purposes described.

2. The pumps E and E', connected to the churn at, or nearly at, a tangent to the circumference of the same, as and for the purposes specified, in combination with the bent cross-head rod $D^1\ D^1$, as described.

JOHN HARRIS.

Witnesses:
FRED. BURRELL,
PERRY J. HALLETT,